(12) United States Patent
Pelly

(10) Patent No.: US 6,781,444 B2
(45) Date of Patent: Aug. 24, 2004

(54) ACTIVE COMMON MODE EMI FILTER, INCLUDING SERIES CASCADED FILTER WITH REDUCED POWER DISSIPATION AND TRANSISTOR VOLTAGE RATING

(75) Inventor: Brian Pelly, Tehachapi, CA (US)

(73) Assignee: International Rectifier Corporation, El Segundo, CA (US)

(*) Notice: Subject to any disclaimer, the term of this patent is extended or adjusted under 35 U.S.C. 154(b) by 0 days.

(21) Appl. No.: 10/443,686

(22) Filed: May 21, 2003

(65) Prior Publication Data

US 2003/0218498 A1 Nov. 27, 2003

Related U.S. Application Data

(60) Provisional application No. 60/382,789, filed on May 22, 2002.

(51) Int. Cl.⁷ .................................................. H03K 5/00
(52) U.S. Cl. ............................ 327/552; 363/37; 363/47; 363/40
(58) Field of Search ................................. 327/552, 551, 327/311; 363/40, 41, 37, 47

(56) References Cited

U.S. PATENT DOCUMENTS

| | | | | |
|---|---|---|---|---|
| 5,757,628 A | * | 5/1998 | Kamata | 361/40 |
| 5,831,842 A | * | 11/1998 | Ogasawara et al. | 363/40 |
| 6,636,107 B2 | * | 10/2003 | Pelly | 327/552 |

* cited by examiner

Primary Examiner—Dinh T. Le
(74) Attorney, Agent, or Firm—Ostrolenk, Faber, Gerb & Soffen, LLP

(57) ABSTRACT

An active EMI filter for reducing common mode noise current in a circuit, comprising: at least one transistor stage, each having two transistors, a current sensor coupled to the circuit and an output driving the transistor stage, a capacitor coupling the transistor stage and the ground return line, providing a cancellation current to cancel the common mode current in the ground return line. In a feed forward arrangement the transistor stage is coupled between the rectifier and the current sensor, which provide an amplitude gain of approximately unity. The transistor stage may have a local power source and a drive transistor.

38 Claims, 6 Drawing Sheets

ACTIVE COMMON MODE EMI FILTER, INCLUDING SERIES CASCADED FILTER WITH REDUCED POWER DISSIPATION AND TRANSISTOR VOLTAGE RATING

CROSS-REFERENCE TO RELATED APPLICATIONS

This application is based upon and claims priority of U.S. Provisional Patent Application Serial No. 60/382,789 filed by Brian Pelly on May 22, 2002 (IR-2285 PROV).

This application is related to copending applications Ser. No. 09/816,590 filed Mar. 23, 2001 (IR-1744); Ser. No. 10/336,157 filed Jan. 2, 2003 (IR-2146); and Ser. No. 10/426,123 filed Apr. 29, 2003 (IR-2166), the disclosures of which are incorporated by reference in their entireties.

BACKGROUND OF THE INVENTION

1. Field of the Invention

This present disclosure describes an active common mode EMI filter employing a number N of series cascaded active filter subcircuits. The power dissipation in the overall active filter, and the required voltage rating of each transistor, is reduced by 1/N, versus known single stage circuits. The power dissipation in each transistor is reduced by $1/N^2$.

The described technique is particularly advantageous for PWM inverter drives that operate from three-phase ac line voltage at 380-480V, where the power dissipated in a single stage active filter circuit may be unacceptably high.

2. Background Art

Previously disclosed active common mode EMI filter circuits have generally been based on a current amplifier with unity gain in a feedforward circuit. One previously disclosed circuit is shown in FIG. 1. This circuit employs IGBTs as the active elements. Other circuits employing MOSFETs and bipolar transistors have previously been disclosed, and follow the same operating principles.

In FIG. 1, the required filter bus voltage, Vbus filt, is determined by the product of the charge, Qtot, associated with each pulse of common mode current, and the value of the coupling capacitor $C_F$ $C_F$ is determined by the permissible amount of line frequency ground leakage current.

Vbus filt must be higher than Qtot/$C_F$. Typically, the minimum required value of Vbus filt thus determined may be substantially less than the full dc bus voltage, Vbus drive, of the PWM inverter.

The average current $I_{av}$ consumed by the transistors of the active filter is Qtot·f, where f is the inverter PWM switching frequency.

The single stage transistor amplifier in FIG. 1 could be connected directly across Vbus drive, even though this voltage might be substantially higher than the minimum needed by the active filter. The disadvantage would be that the voltage rating and power dissipation in the transistors would be higher than necessary. The total combined average power dissipation in the two transistors in this case would be Qtot·f·Vbus drive.

A previously described method for reducing the required voltage rating and power dissipation in the transistors of the active filter in the circuit of FIG. 1, is to derive a lower filter bus voltage from Vbus drive, via a voltage dropping resistor, as shown in FIG. 2. The required voltage rating of the transistors, and the total combined average power in the two transistors of the active filter, are reduced by Vbus filt/Vbus drive. The total combined power dissipation in the voltage dropping resistor, the two transistors of the active filter, and the voltage clamping zener diode, however, exceeds Qtot·f·Vbus drive. This is because the average current drawn through the dropping resistor from the dc bus is now higher than Qtot·f, due to the added current $I_Z$ drawn by the zener diode.

Another previously disclosed circuit is shown in FIG. 3. This circuit is similar to the circuit in FIG. 1, but employs N-channel MOSFETs as the active elements, and has a voltage divider R1, R2 for balancing the average voltages across Q1 and Q2. A difficulty with this circuit (as well as with the circuits of FIGS. 1 and 2) is that the MOSFETs (IGBTs) draw significant gate current from the overwindings on the current-sensing transformer, via the gate-source (gate-emitter) and drain-gate (collector-gate) capacitances. This causes a significant error in the output current of the amplifier.

SUMMARY OF THE INVENTION

To meet these needs, various embodiments of the invention provide an active EMI filter for reducing common mode noise current in a circuit comprising a rectifier coupled to an AC network, the rectifier supplying DC power to a DC bus, the DC bus feeding an inverter stage for providing AC power to a load, the load having a ground return line to a ground connection of the AC network. The active filter preferably comprises a transistor stage, a current sensor such as a current transformer coupled to a branch of the circuit having the common mode noise current flowing therein, the current sensor having an input such as a primary winding coupled for sensing said common mode noise current and an output such as a secondary winding driving the transistor stage, the transistor stage comprising two transistors driven by said output of the current sensor in response to the common mode noise current, and a capacitor coupling the transistor stage and the ground return line, the capacitor providing a cancellation current to the ground return line from the transistor stage to substantially cancel the common mode current in the ground return line.

The current sensor and the transistor stage are coupled in a feed forward arrangement whereby the transistor stage is coupled between the rectifier and the current sensor, the transistor stage and said current sensor having an amplitude gain of approximately unity.

In the transistor stage, a control electrode drive current may be provided to each transistor by a local power source such as a storage capacitor, via a drive transistor. There may be two drive transistors, each having two main electrodes, one main electrode of each drive transistor being connected to a respective control electrode of one of said two transistors, and each drive transistor having a control electrode, the control electrodes of the drive transistors being coupled respectively to additional secondaries of the current transformer.

The other main electrode of each of the drive transistors may be connected to the local power source, which may be a respective local storage capacitor which is connected across the corresponding drive transistor and its respective current transformer secondaries.

The local power source may further comprise two dropping resistors, connected in a series network alternating with the local storage capacitors. The network may be connected across a DC supply voltage. A voltage regulator, for example a zener diode, may be connected across each of said local storage capacitors.

Also, the filter may comprise a plurality of cascaded transistor stages coupled in series for providing an active common mode EMI filter with reduced power dissipation and transistor voltage rating.

Preferably there are a plurality of capacitors which respectively couple each of said transistor stages to said ground return line.

Each transistor stage preferably has a respective local current transformer, said local current transformer having a primary which is coupled to said output of the first-mentioned current transformer, and having a secondary which is coupled to the corresponding two transistors. A main electrode of each transistor may be coupled to a respective secondary of said local current transformer, and a control electrode of each of said transistors may be coupled to another respective secondary of said local current transformer. The other secondaries of said local current transformers may provide bias voltages for the control electrodes of said corresponding two transistors.

Preferably the primary and secondary of each said local current transformer have the same number of turns, while the other secondary of the local current transformer has a greater number of turns than the primary.

Advantageously the secondary of the main (first-mentioned) current transformer has N times the number of primary turns, N being the number of transistor switching stages.

In all embodiments of the invention, a respective local filter bus capacitor may be connected across each said transistor stage.

Other features and advantages of the invention will be appreciated from the following description of several embodiments thereof, with reference to the drawings, in which like references denote like elements and parts.

DETAILED DESCRIPTION OF EMBODIMENTS OF THE INVENTION

Figure 1:
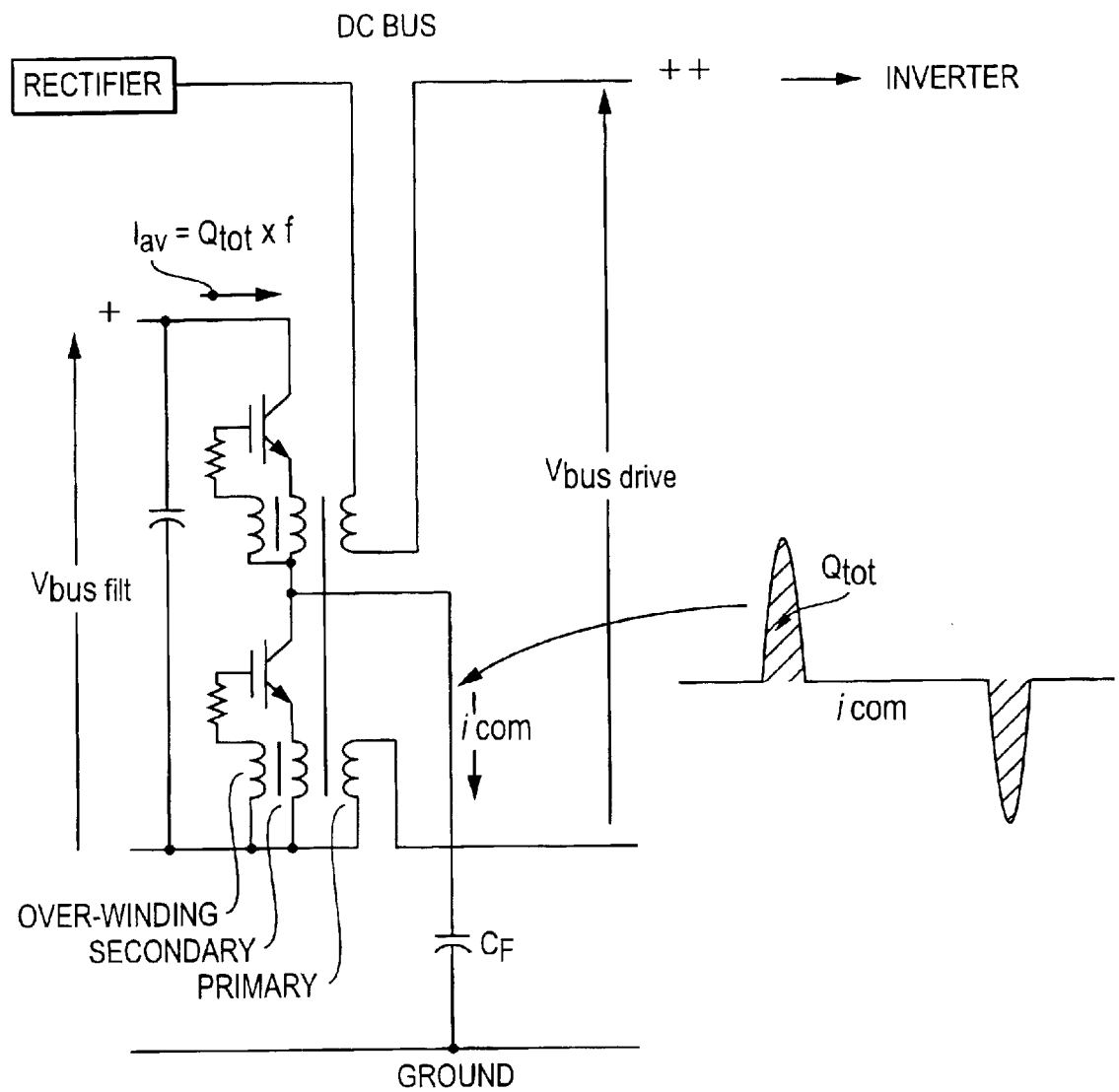
FIG. 1 shows a first known active common mode EMI filter circuit in which transistor bias is derived from an overwinding on the current sensing transformer.
Figure 2:
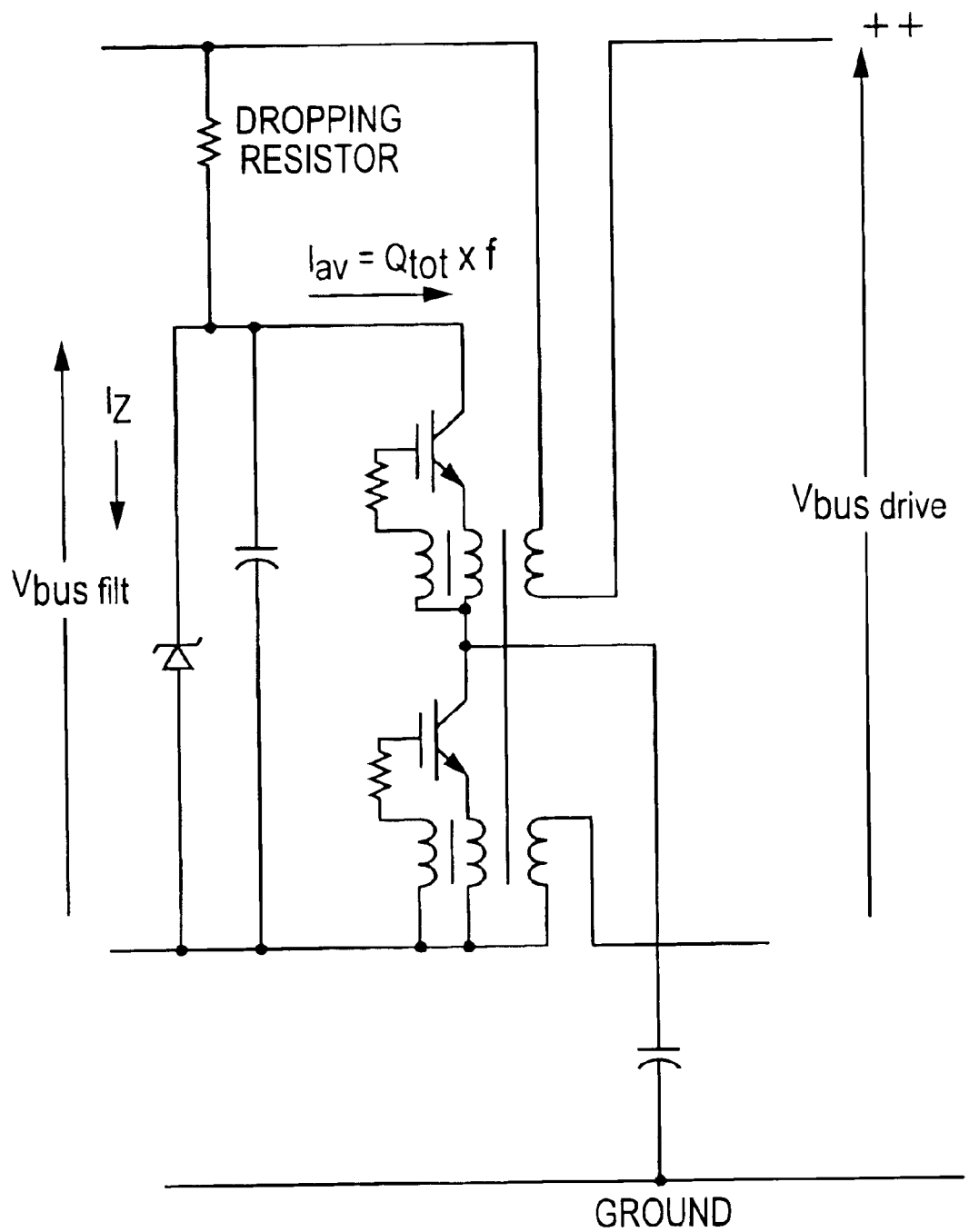
FIG. 2 shows a second previously known active common mode EMI filter circuit having a network for deriving a bus voltage for the filter circuit.
Figure 4:
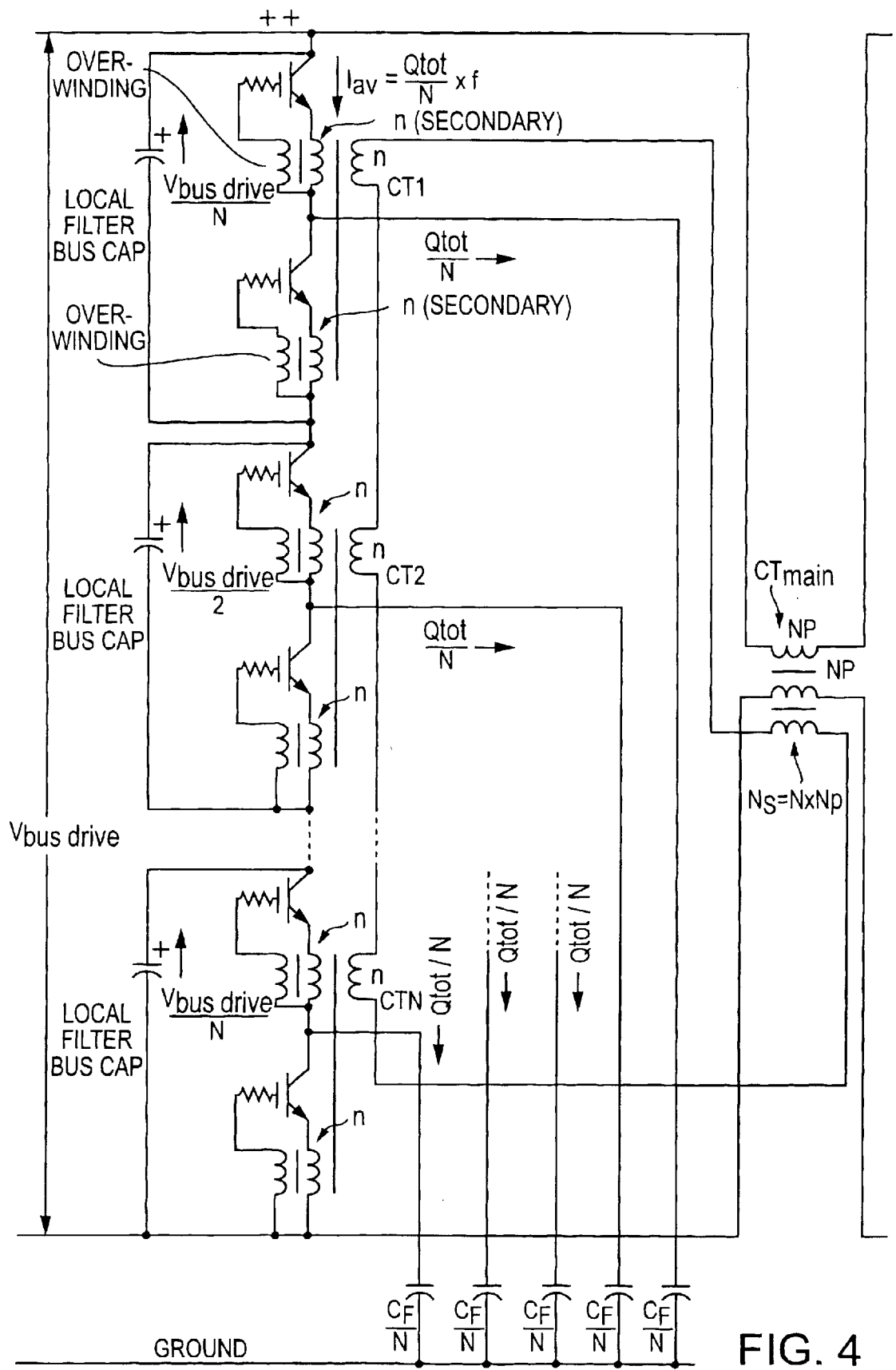
FIG. 4 shows an active common mode EMI filter circuit according to a first embodiment of the invention having a plurality of series cascaded filters.

A first embodiment of the invention is illustrated in FIG. 4. The linear voltage dropping circuit of FIG. 2 is in effect replaced by (N-1) active filter subcircuits, cascaded in series across the dc bus. Each subcircuit has its own local "filter bus", and is coupled to ground at its output via capacitance of $C_F/N$. Each subcircuit delivers a common mode charge of Qtot/N to the ground line, and the total common mode charge delivered to ground by all N subcircuits is still Qtot. Note that due to the series connection of the active filter subcircuits, the total charge delivered by the dc bus is now only Qtot/N, and the average current delivered by the dc bus is (Qtot/N)·f. Thus, the average current drawn from the dc bus has decreased by 1/N, relative to a single stage circuit.

The combined dissipation in the two transistors of each active filter subcircuit is now reduced to (Vbus drive/N)·(Qtot·f/N), that is, to $1/N^2$ of that of a single stage circuit connected directly across Vbus drive.

The combined total power dissipation of all N subcircuits is Q·f·Vbus drive /N i.e. somewhat less than 1/N of the total power of the single stage circuit of FIG. 2. The voltage rating of each transistor is 1/N of that needed for a single stage circuit connected directly across Vbus drive.

It is advantageous to drive each active filter subcircuit so that it delivers 1/N of the total common mode current to ground. This ensures equal currents at the outputs of all subcircuits, and thus also that the total inverter bus voltage is shared equally between the local filter bus capacitors of each sub-circuit.

The common mode current sensing transformer, $CT_{main}$, has a single secondary with $N_S$=N·the number of primary turns. The secondary current of $CT_{main}$ is 1/N·the total common mode current in the primary. Each active filter subcircuit is driven from its own small local current transformer, $CT_1$ through $CT_N$, each with a primary to secondary turns ratio of unity. The primaries of each of these local current transformers are connected in series with the secondary winding of $CT_{main}$. Thus, the primary and secondary current of each local current transformer is 1/N·the common mode current in the primary of $CT_{main}$, and each active filter subcircuit is forced to deliver 1/N·the primary common mode current. The sum of the output currents of all active filter subcircuits is thus equal to the common mode current in the primary of $CT_{main}$.

Figure 5:
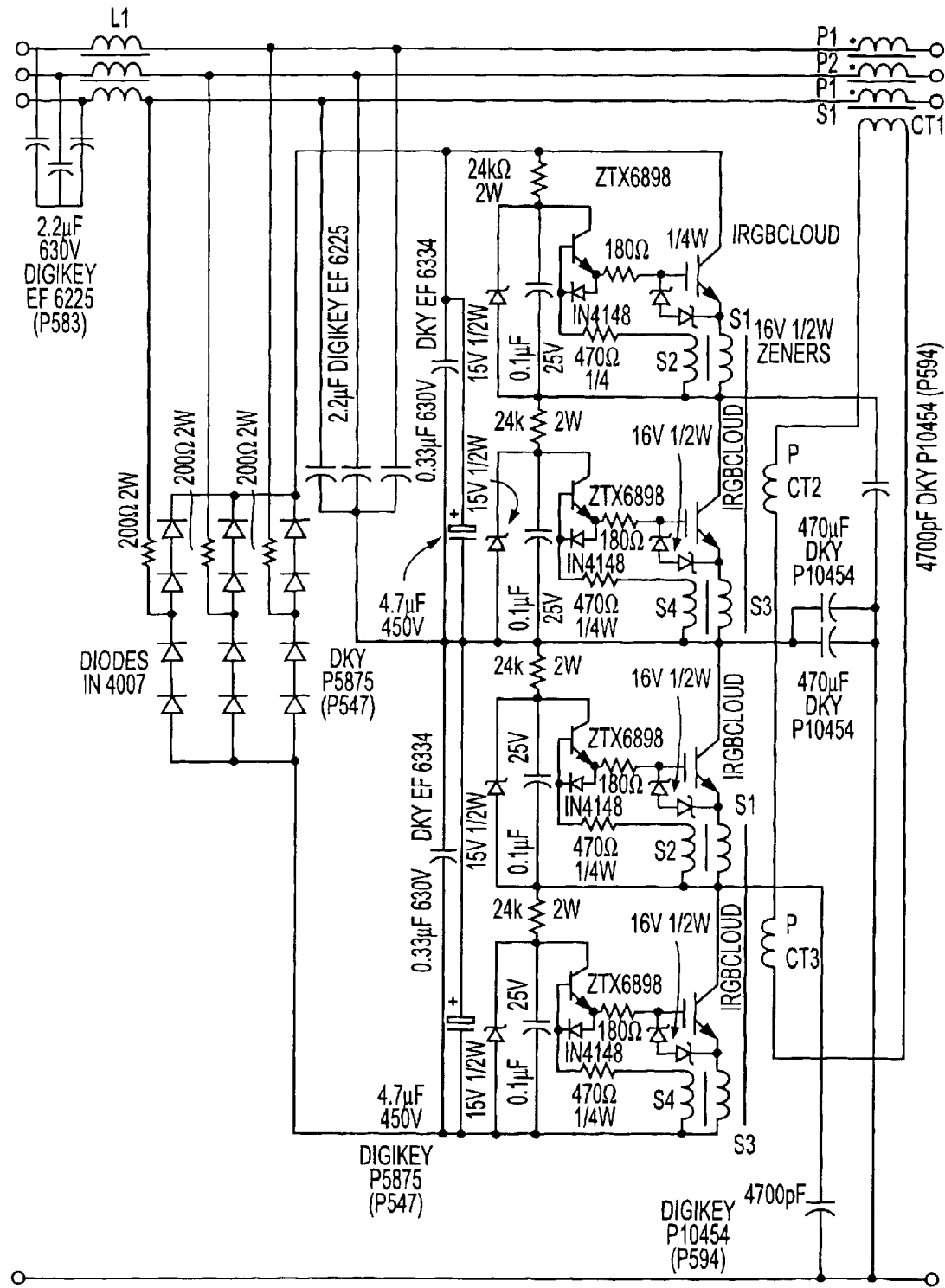
FIG. 5 shows an active common mode EMI filter circuit according to a second embodiment of the invention having a plurality of series cascaded filters, and wherein gate drive current for the two transistors is provided substantially from local power storage capacitors via a pair of respective drive transistors.
Figure 6:
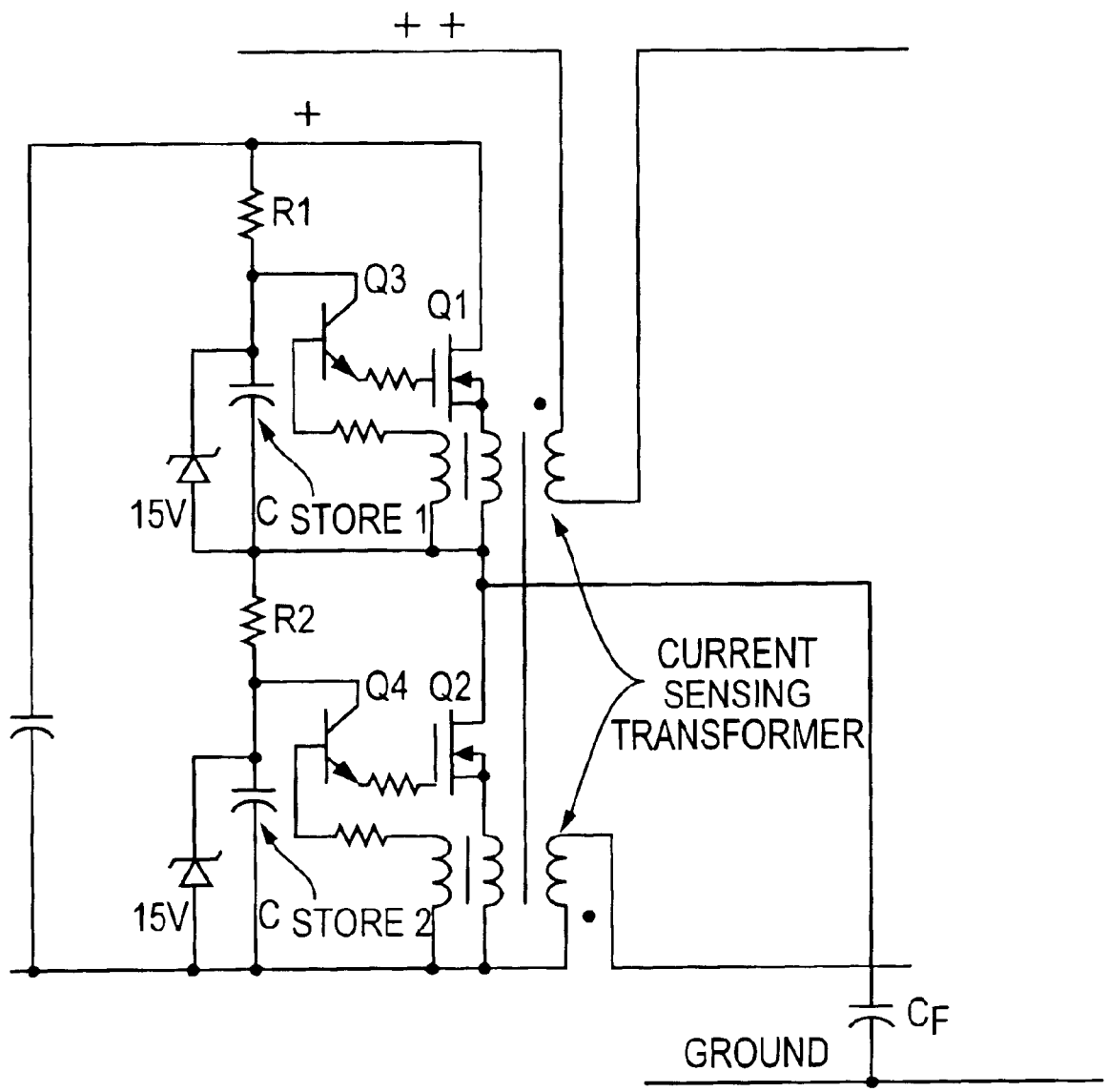
FIG. 6 shows an active common mode EMI filter circuit according to a third embodiment of the invention, wherein gate drive current for the two transistors is provided substantially from local power storage capacitors via a pair of respective drive transistors.

A second embodiment, shown in FIG. 5, is an example of a practical design incorporating both the first and third embodiments (FIGS. 4 and 6). This circuit is designed for a 380-480V 3-phase 7.5 kW pump drive manufactured by Grundfoss. The inverter PWM frequency is 18 kHz. CT1 core is ZW43616. Primaries P1, P2, P3 are 7 turns #14. Secondary S1 is 14 turns #30. CT2 and CT3 cores are ZW42207. Primary is 30 turns #30, secondaries S1, S2, S3, S4 are 30 turns #30. For L1 the core is ZW 43616 and each winding is 7 turns #14. The IGBT's have AAVID 576802B03100 heat sink (Newark 34C4484).

Two series cascaded subcircuits are used, each with 600V IGBTs. The estimated power loss in each IGBT is 3.8W. By comparison, a single stage active filter connected directly across the inverter dc bus would need 1200V IGBTs, and the dissipation in each IGBT would be about 15W.

The circuit in FIG. 5 is designed as an ac-to-ac front end filter, to be connected into the 3-phase input line of the pump drive. This is convenient for test purposes, because the active filter circuit is non-invasive into the inverter drive itself.

A simpler approach for a final design would be to integrate the two cascaded active filters directly across the inverter dc bus. Two bus capacitors would in either design be connected in series across the total inverter bus allowing each active filter subcircuit to be connected across one of the already existing dc bus capacitors of the inverter.

Figure 3:
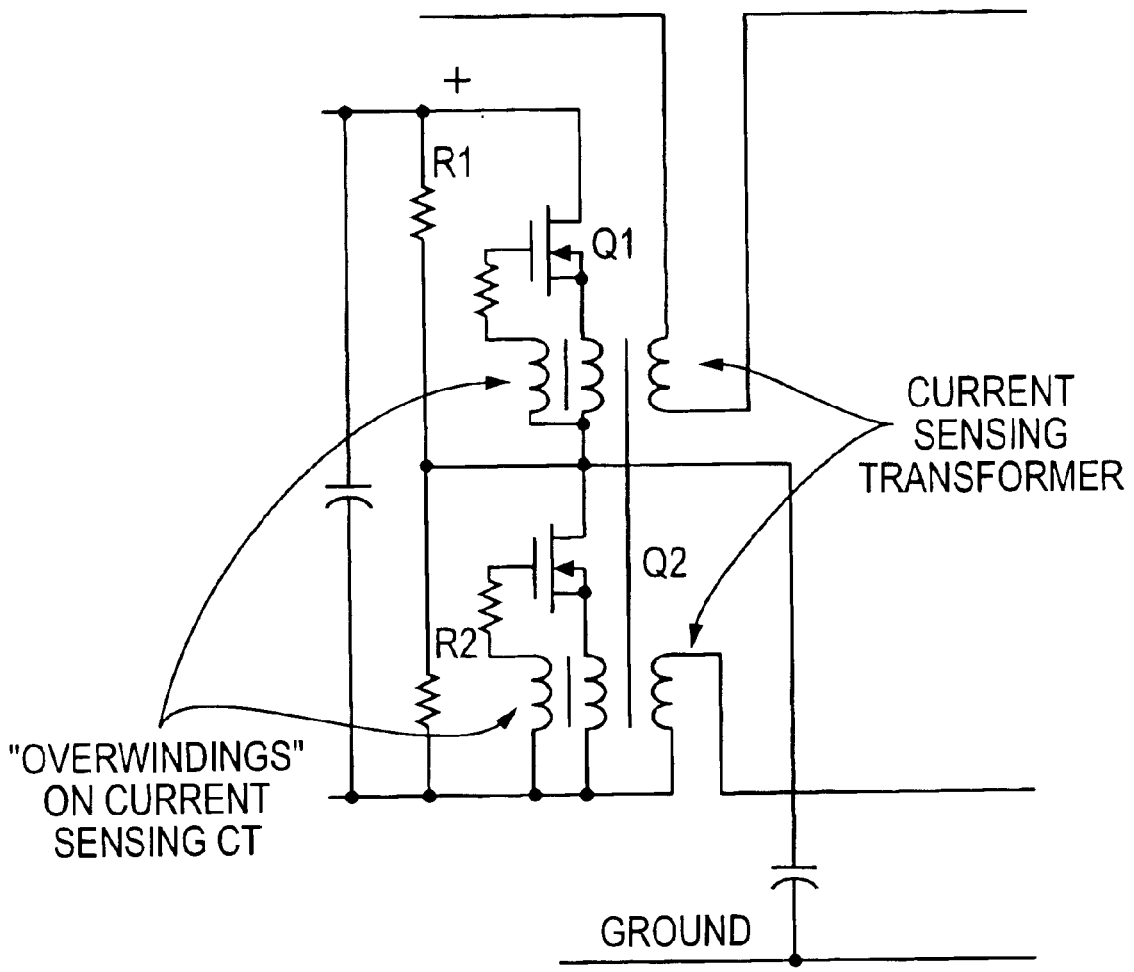
FIG. 3 shows a third previously known active common mode EMI filter circuit having a network for balancing respective voltages across the two transistors.

A third embodiment, which is an improvement to the circuit of FIG. 3, is shown in FIG. 6. The gate drive current for the MOSFETs (IGBTs) is substantially delivered from the local storage capacitors $C_{store}1$ and $C_{store}2$, via the collector-emitter of the added gate drive transistors Q3 and Q4, rather than from the secondary "overwindings" of the current transformer. The error in the output current of the amplifier is significantly reduced.

The "local power supply" storage capacitors $C_{store}1$ and $C_{store}2$ are connected into the resistor network, R1 and R2, already provided for voltage sharing.

The added driver transistors Q3 and Q4 need be rated only about 20V, and carry only the gate drive current of the MOSFET (or IGBT). They are relatively small components.

Although the present invention has been described in relation to particular embodiments thereof, many other variations and modifications and other uses will become apparent to those skilled in the art. Therefore, the present invention is not limited by the specific disclosure herein.

What is claimed is:

1. An active EMI filter for reducing common mode noise current in a circuit comprising a rectifier coupled to an AC network, the rectifier supplying DC power to a DC bus, the DC bus feeding an inverter stage for providing AC power to a load, the load having a ground return line to a ground connection of the AC network, the active filter comprising:
    a plurality of transistor stages coupled in series, each of said transistor stages comprising two transistors;
    a main current sensor for sensing the common mode noise current in said circuit, said main current sensor comprising a current transformer having a primary coupled to a branch of said circuit in which common mode noise current occurs;
    the main current sensor having an output coupled to each of the transistor stages, the transistor stages being driven by said output in response to the common mode noise current;
    at least one capacitor coupling said transistor stages to said ground return line, said at least one capacitor providing a cancellation current to said ground return line from said transistor stages to substantially cancel the common mode noise current in the ground return line.

2. The active filter of claim 1, wherein said at least one capacitor comprises a respective capacitor coupling each of said transistor stages to said ground return line.

3. The active filter of claim 1, wherein each said transistor stage has a respective local current transformer, said local current transformer having a primary which is coupled to said output of said main current transformer, and having an output which is connected to the corresponding said two transistors.

4. The active filter of claim 3, wherein a main electrode of each transistor is coupled to a respective secondary of said local current transformer, and wherein a control electrode of each of said transistors is coupled to another respective secondary of said local current transformer.

5. The active filter of claim 4, wherein said other secondaries of said local current transformers provide bias voltages for the control electrodes of said corresponding two transistors.

6. The active filter of claim 3, wherein said primary and said secondary of each said local current transformer have the same number of turns.

7. The active filter of claim 6, wherein said other secondary of said local current transformer has a greater number of turns than said primary.

8. The active filter of claim 1, wherein said main current sensor and said plurality of transistor stages are coupled in a feed forward arrangement wherein said transistor stages and said main current sensor have an amplitude gain of approximately unity.

9. The active filter of claim 1, wherein the transistors are IGBTs.

10. The active filter of claim 9, wherein said IGBTs are of the same type.

11. The active filter of claim 1, wherein said at least one capacitor couples said ground return line to a common node between said two transistors in each said transistor stage.

12. The active filter of claim 1, wherein said secondary of said main current transformer has N times the number of primary turns, N being the number of transistor switching stages.

13. The active filter of claim 1, further comprising a respective local filter bus capacitor connected across each said transistor switching stage.

14. An active EMI filter for reducing common mode noise current in a circuit comprising a rectifier coupled to an AC network, the rectifier supplying DC power to a DC bus, the DC bus feeding an inverter stage for providing AC power to a load, the load having a ground return line to a around connection of the AC network, the active filter comprising:
    a transistor stage comprising two transistors;
    a current sensor for sensing the common mode noise current flowing in said circuit, the current sensor having an input coupled to a branch of said circuit in which common mode noise current occurs and an output driving the transistor stage, the two transistors of the transistor stage being driven by said output of the current sensor in response to the common mode noise current;
    a capacitor coupling said transistor stare and said ground return line, said capacitor providing a cancellation current to said ground return line from said transistor stage to substantially cancel the common mode current in said ground return line;
    said two transistors of said transistor stage each having two main electrodes and one control electrode;
    said current sensor comprising a current transformer having a primary coupled to said circuit branch in which common mode noise current occurs, and a secondary coupled to one main electrode of a respective said transistor;
    a control electrode of each transistor being coupled to another secondary of said current transformer; and further comprising
        third and fourth drive transistors, each having two main electrodes, one main electrode of each of said drive transistors being connected to a respective control electrode of one of said two transistors, and each of said third and fourth transistors having a control electrode, said control electrodes of said drive transistors being coupled respectively to said other secondaries of said current transformer.

15. The active filter of claim 14, wherein the two transistors are MOSFETs.

16. The active filter of claim 14, wherein the two transistors are connected together in series.

17. The active filter of claim 14, wherein said current sensor and said transistor stage are coupled in a feed forward arrangement wherein said transistor stage and said current sensor have an amplitude gain of approximately unity.

18. The active filter of claim 14, wherein said capacitor connects said ground return line in common to respective main electrodes of said two transistors.

19. The active filter of claim 14, wherein the other main electrode of each of said third and fourth transistors is connected to a local power supply.

20. The active filter of claim 19, wherein said local power supply comprises a respective local storage capacitor which is connected across the corresponding drive transistor and its respective current transformer secondaries.

21. The active filter of claim 20, wherein said local power supply further comprises two dropping resistors, connected in a series network alternating with said local storage capacitors.

22. The active filter of claim 21, wherein said network is connected across a DC supply voltage.

23. The active filter of claim 20, further comprising a voltage regulator connected across each of said local storage capacitors.

24. The active filter of claim 23, wherein said voltage regulator is a zener diode.

25. The active filter of claim 14, further comprising a respective local filter bus capacitor connected across each said transistor stage.

26. An active EMI filter for reducing common mode noise current in a circuit comprising a rectifier coupled to an AC network, the rectifier supplying DC power to a DC bus, the DC bus feeding an inverter stage for providing AC power to a load, the load having a ground return line to a ground connection of the AC network, the active filter comprising:
- a plurality of transistor stages coupled in series, each of said transistor stages comprising two transistors, said two transistors of each said transistor stage each having two main electrodes and one control electrode;
- a main current sensor for sensing the common mode noise current in said circuit, said main current sensor comprising a current transformer having a primary coupled to a branch of said circuit in which common mode noise current occurs;
- said current transformer having a secondary coupled to a main electrode of each of the transistor stages, the transistor stages being driven by said output in response to the common mode noise current;
- at least one capacitor coupling said transistor stages to said ground return line, said at least one capacitor providing a cancellation current to said ground return line from said transistor stages to substantially cancel the common mode noise current in the ground return line; and
- a control electrode of each transistor being coupled to another secondary of said current transformer.

27. The active filter of claim 26, wherein said at least one capacitor comprises a respective capacitor coupling each of said transistor stages to said ground return line.

28. The active filter of claim 26, wherein each said transistor stage has a respective local current transformer, said local current transformer having a primary which is coupled to said output of said main current transformer, and having an output which is connected to the corresponding said two transistors.

29. The active filter of claim 28, wherein a main electrode of each transistor is coupled to a respective secondary of said local current transformer, and wherein a control electrode of each of said transistors is coupled to another respective secondary of said local current transformer.

30. The active filter of claim 29, wherein said other secondaries of said local current transformers provide bias voltages for the control electrodes of said corresponding two transistors.

31. The active filter of claim 28, wherein said primary and said secondary of each said local current transformer have the same number of turns.

32. The active filter of claim 31, wherein said other secondary of said local current transformer has a greater number of turns than said primary.

33. The active filter of claim 26, wherein said main current sensor and said plurality of transistor stages are coupled in a feed forward arrangement wherein said transistor stages and said main current sensor have an amplitude gain of approximately unity.

34. The active filter of claim 26, wherein said secondary of said main current transformer has N times the number of primary turns, N being the number of transistor switching stages.

35. The active filter of claim 26, further comprising a respective local filter bus capacitor connected across each said transistor switching stage.

36. The active filter of claim 26, further comprising third and fourth drive transistors in each transistor stage, each having two main electrodes, one main electrode of each of said drive transistors being connected to a respective control electrode of one of said two transistors, and each of said third and fourth transistors having a control electrode, said control electrodes of said drive transistors being coupled respectively to said other secondaries of said current transformer.

37. The active filter of claim 36, wherein the other main electrode of each of said third and fourth transistors is connected to a local power supply.

38. The active filter of claim 37, wherein said local power supply comprises a respective local storage capacitor which is connected across the corresponding drive transistor and its respective current transformer secondaries.

* * * * *